UNITED STATES PATENT OFFICE.

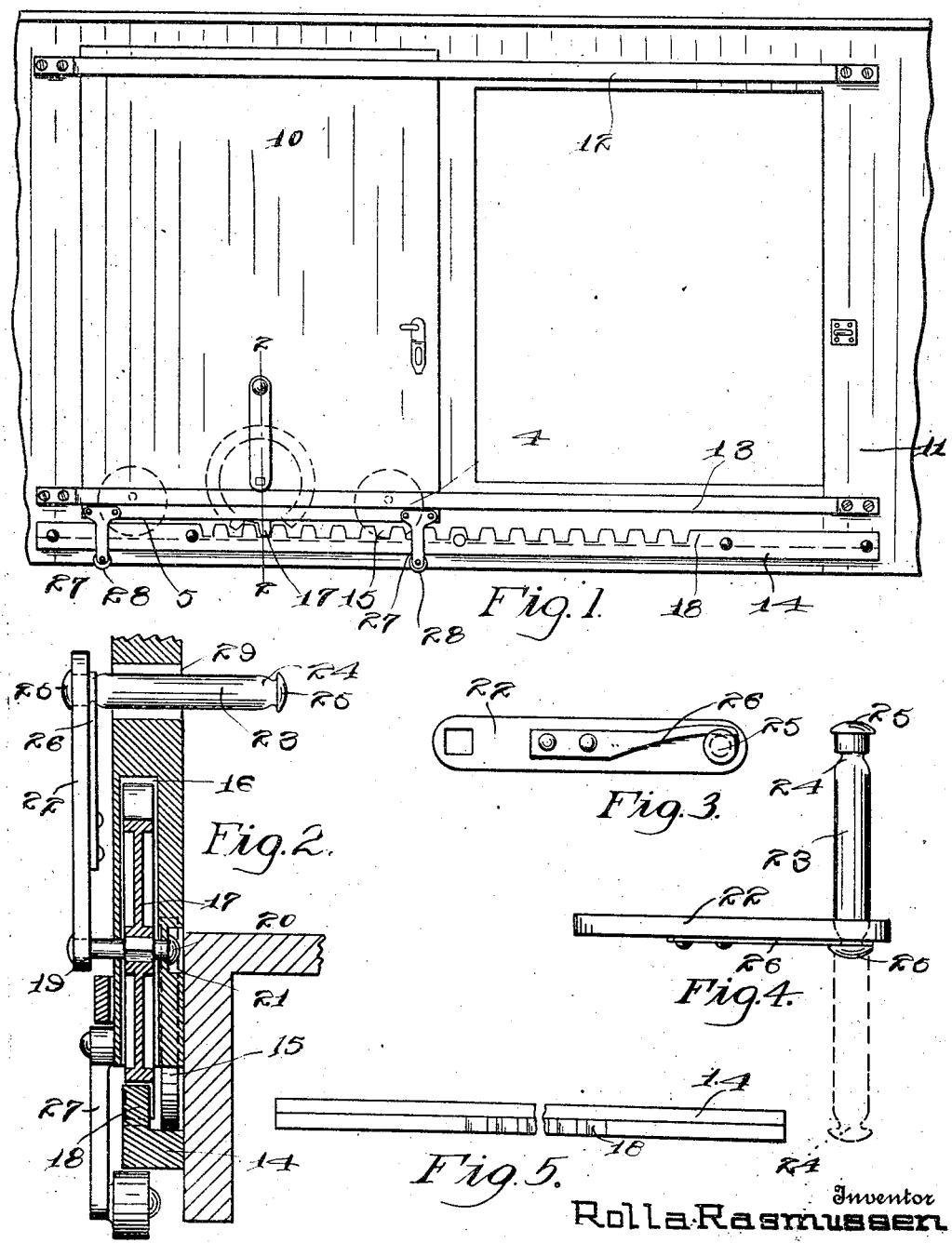

ROLLA RASMUSSEN, OF CALISTOGA, CALIFORNIA.

CAR-DOOR FASTENER.

1,011,893.

Specification of Letters Patent. Patented Dec. 12, 1911.

Application filed June 10, 1911. Serial No. 632,397.

*To all whom it may concern:*

Be it known that I, ROLLA RASMUSSEN, a citizen of the United States, residing at Calistoga, in the county of Napa and State of California, have invented certain new and useful Improvements in Car-Door Fasteners, of which the following is a specification.

This invention relates to car door fasteners, and the principal object of the same is to provide an operating device having a novel type of handle by means of which the door may be locked in a desired position.

This invention is illustrated in the accompanying drawings, wherein:—

Figure 1 is a view in side elevation of a car having the improved door mounted thereon. Fig. 2 is a section taken along the line 2—2 in Fig. 1. Fig. 3 is an enlarged view of the inner face of the crank. Fig. 4 is a top plan view of the crank and handle and indicating by the dotted lines the second position of the handle. Fig. 5 is a plan view of the track.

Referring to the accompanying drawings it will be seen that this door 10 is mounted upon a freight car 11 and is held in a vertical position by means of the guide bars 12 and 13 and is mounted upon a track 14. The lower portion of the door is provided with recesses in which the supporting rollers 15 are mounted so that the door may be easily moved along the track and is provided with a deeper recess 16 formed between the rollers 15 in which a gear wheel 17 is mounted. The gear wheel is positioned out of alinement with the rollers 15 and engages the teeth formed upon a flange 18 carried by the track 14. The gear wheel is mounted upon an axle 19 which has its inner end formed into a head 20 which is mounted in a socket 21 and has a crank 22 mounted upon its outer end. A handle 23 provided with grooves 24 adjacent each end is mounted in an opening formed in the crank 22 and is held in place by means of the heads 25. A spring arm 26 is mounted upon the inner face of the crank 22 and is adapted to engage one of the grooves 24 to hold the handle in either the position shown in Fig. 2 or the position shown in Fig. 4. A bracket 27 is mounted adjacent each lower corner of the door and has a roller 28 at its lower end which is positioned beneath the bracket 14 and prevents the door from having any upward movement.

In operating this door the handle is moved to the position shown in Fig. 4 and the gear wheel 17 is rotated to cause the door to move along the track to the closed position. When the door is closed, the handle 23 is moved inwardly so that it passes through an opening 29 formed in the door and prevents the door from accidentally swinging open.

What I claim as my invention is:—

1. A door, a track for said door, an operating wheel rotatably mounted in said door and engaging said track, said door being provided with an opening above said operating wheel, a crank mounted upon the axle of said wheel, and a handle slidably mounted in the free end of said crank, said handle adapted to be inserted through the opening formed in said door to lock said wheel.

2. A door provided with a transverse opening, a track, an operating wheel carried by said door and engaging said track, a crank connected with said wheel, a handle slidably mounted in the free end of said crank and provided with circumferential grooves adjacent its ends, and a spring arm mounted upon said crank and adapted to engage said grooves to lock said handle in a desired position, said handle adapted to enter the opening formed in said door to lock said wheel against rotation.

In testimony whereof I affix my signature in presence of two witnesses.

ROLLA RASMUSSEN.

Witnesses:
A. RASMUSSEN,
L. ROSSI.